(12) United States Patent
Shaffer et al.

(10) Patent No.: US 11,748,350 B2
(45) Date of Patent: Sep. 5, 2023

(54) SYSTEM AND METHOD FOR MACHINE LEARNING FOR SYSTEM DEPLOYMENTS WITHOUT PERFORMANCE REGRESSIONS

(71) Applicant: Microsoft Technology Licensing, LLC, Redmond, WA (US)

(72) Inventors: Irene Rogan Shaffer, Cambridge, MA (US); Remmelt Herbert Lieve Ammerlaan, Cambridge, MA (US); Gilbert Antonius, Cambridge, MA (US); Marc T. Friedman, Seattle, WA (US); Abhishek Roy, Bellevue, WA (US); Lucas Rosenblatt, Somerville, MA (US); Vijay Kumar Ramani, Boston, MA (US); Shi Qiao, Mercer Island, WA (US); Alekh Jindal, Sammamish, WA (US); Peter Orenberg, Braintree, MA (US); H M Sajjad Hossain, Waltham, MA (US); Soundararajan Srinivasan, Cambridge, MA (US); Hiren Shantilal Patel, Bothell, WA (US); Markus Weimer, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 334 days.

(21) Appl. No.: 16/840,205

(22) Filed: Apr. 3, 2020

(65) Prior Publication Data
US 2021/0263932 A1 Aug. 26, 2021

Related U.S. Application Data

(60) Provisional application No. 62/979,808, filed on Feb. 21, 2020.

(51) Int. Cl.
*G06F 11/34* (2006.01)
*G06F 16/2453* (2019.01)
(Continued)

(52) U.S. Cl.
CPC .... *G06F 16/24542* (2019.01); *G06F 11/3466* (2013.01); *G06F 16/9024* (2019.01); *G06N 20/00* (2019.01)

(58) Field of Classification Search
CPC .......... G06F 16/24542; G06F 11/3466; G06F 16/9024; G06F 11/3409; G06F 16/24549;
(Continued)

(56) References Cited

U.S. PATENT DOCUMENTS 10,936,589 B1 * 3/2021 Beitchman ........ G06F 16/24542
11,113,117 B2 * 9/2021 Jha ........................ G06F 9/5077
(Continued)

OTHER PUBLICATIONS

Hossain, et al., "PerfGuard: Deploying ML-for-Systems without Performance", Retrieved from: https://www.irenerogan.com/papers/perfguard.pdf, Jul. 31, 2017, 3 Pages.
(Continued)

*Primary Examiner* — Jorge A Casanova
(74) *Attorney, Agent, or Firm* — Weaver IP L.L.C.

(57) ABSTRACT

Methods of machine learning for system deployments without performance regressions are performed by systems and devices. A performance safeguard system is used to design pre-production experiments for determining the production readiness of learned models based on a pre-production budget by leveraging big data processing infrastructure and deploying a large set of learned or optimized models for its query optimizer. A pipeline for learning and training differentiates the impact of query plans with and without the learned or optimized models, selects plan differences that are likely to lead to most dramatic performance difference, runs
(Continued)

a constrained set of pre-production experiments to empirically observe the runtime performance, and finally picks the models that are expected to lead to consistently improved performance for deployment. The performance safeguard system enables safe deployment not just for learned or optimized models but also for additional of other ML-for-Systems features.

20 Claims, 7 Drawing Sheets

(51) Int. Cl.
    *G06F 16/901*     (2019.01)
    *G06N 20/00*     (2019.01)

(58) Field of Classification Search
    CPC .. G06F 16/2453; G06N 20/00; G06N 3/0454; G06N 3/08
    See application file for complete search history.

(56) References Cited

U.S. PATENT DOCUMENTS

| | | | |
|---|---|---|---|
| 2017/0006135 A1* | 1/2017 | Siebel | H04L 67/12 |
| 2017/0126795 A1* | 5/2017 | Kumar | G06F 9/505 |
| 2018/0314735 A1* | 11/2018 | Liu | G06F 16/24532 |
| 2019/0213475 A1* | 7/2019 | Erlandson | G06K 9/6282 |
| 2019/0384845 A1* | 12/2019 | Saxena | G06F 16/24545 |
| 2020/0125568 A1* | 4/2020 | Idicula | G06F 16/217 |
| 2020/0279187 A1* | 9/2020 | Huang | G06F 11/3447 |
| 2021/0081409 A1* | 3/2021 | Rath | G06F 11/3409 |
| 2021/0248136 A1* | 8/2021 | Panuganty | G06F 16/243 |

OTHER PUBLICATIONS

"International Search Report and Written Opinion Issued in PCT Application No. PCT/US21/014035", dated Jun. 7, 2021, 12 Pages.

Bai, et al., "SimGNN: A Neural Network Approach to Fast Graph Similarity Computation", In Proceedings of the Twelfth ACM International Conference on Web Search and Data Mining, Feb. 11, 2019, pp. 384-392.

Chaiken, et al., "SCOPE: Easy and Efficient Parallel Processing of Massive Data Sets", In Proceedings of the VLDB Endowment, vol. 1, Issue 2, Aug. 1, 2008, pp. 1265-1276.

Harmouch, et al., "Cardinality Estimation: An Experimental Survey", In Proceedings of the VLDB Endowment, vol. 11, Issue 4, Dec. 1, 2017, pp. 499-512.

Ortiz, et al., "An Empirical Analysis of Deep Learning for Cardinalilty Estimation", In Journal of Computing Research Repository, May 2019, 17 Pages.

Wu, et al., "Towards a Learning Optimizer for Shared Clouds", In Proceedings of the VLDB Endowment, vol. 12, Issue 3, Nov. 2018, pp. 210-222.

Yang, et al., "Deep Unsupervised Cardinality Estimation", In Proceedings of the VLDB Endowment, vol. 13, Issue 3, Nov. 1, 2019, pp. 279-292.

Ammerlaan, et al., "PerfGuard: Deploying ML-for-Systems without Performance Regressions, Almost!", In Proceedings of the VLDB Endowment, vol. 14, Issue 13, Sep. 1, 2021, pp. 3362-3375, downloadable at https://dl.acm.org/doi/abs/10.14778/3484224.3484233.

Hossain, et al., "PerfGuard: Deploying ML-for-Systems without Performance", Retrieved from: https://alekh.org/papers/perfguard.pdf, published no earlier than Dec. 16, 2019, 3 Pages.

* cited by examiner

SYSTEM AND METHOD FOR MACHINE LEARNING FOR SYSTEM DEPLOYMENTS WITHOUT PERFORMANCE REGRESSIONS

CROSS-REFERENCE TO RELATED APPLICATION(S)

This application claims priority to U.S. Provisional Pat. Appl. No. 62/979,808, entitled "SYSTEM AND METHOD FOR MACHINE LEARNING FOR SYSTEM DEPLOYMENTS WITHOUT PERFORMANCE REGRESSIONS," filed on Feb. 21, 2020, the entirety of which is incorporated by reference herein.

BACKGROUND

The traditional practice for determining production readiness of new features for systems is to run standard benchmarks (e.g., TPC-H or TPC-DS for analytical workloads) in a controlled environment. However, benchmarks often do not represent the customer workloads seen in production. Increasingly, cloud services run a subset of production workloads in a pre-production environment and determine the production readiness from the results. Designing these pre-production experiments is a challenge and is done manually using best effort. The newer trend of applying machine learning to systems, i.e., features that incorporate machine learning models to improve system behavior, adds to these issues. Machine learning-based features typically consist of a large set of models that are complex and hard to reason about. As a result, it is difficult and costly to manually design the pre-production experiments that identify safe-to-deploy models and determine production readiness of new features, which can result in performance regressions over workloads of systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods of machine learning (ML) for system deployments without performance regressions are performed by systems and devices. A performance safeguard system is used to design pre-production experiments for determining the production readiness of learned models based on a pre-production budget by leveraging big data processing infrastructure and deploying a large set of learned or optimized models for its query optimizer. A pipeline for learning and training differentiates the impact of query plans with and without the learned or optimized models, selects plan differences that are likely to lead to the most significant performance difference, runs a constrained set of pre-production experiments to empirically observe the runtime performance, and finally picks the models that are expected to lead to consistently improved performance for deployment. The performance safeguard system enables safe deployment not just for learned or optimized models but also for a plethora of other ML-for-Systems features.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
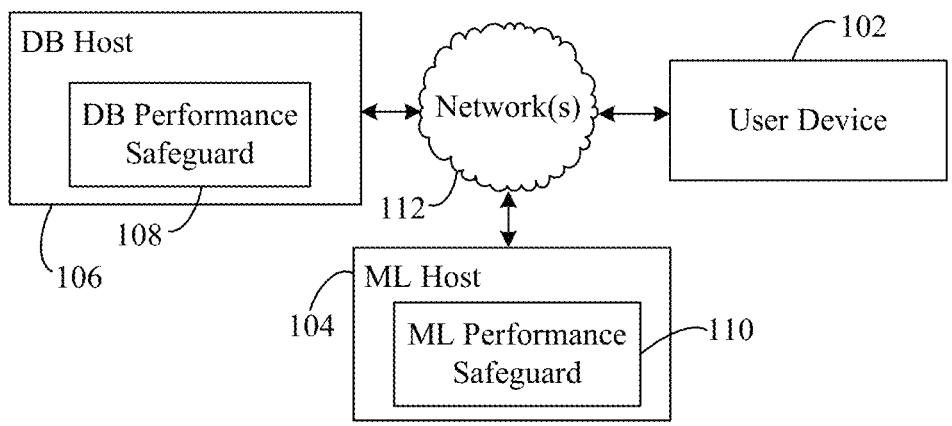
FIG. 1 shows a block diagram of a system that enables system deployments using machine learning (ML) without performance regressions, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for machine learning for system deployments without performance regressions. Section III below describes example mobile and computing device embodiments that may be used to implement features of the embodiments described herein. Section IV below describes additional examples and advantages, and Section V provides some concluding remarks.

II. Example Embodiments for ML-for-System Deployments without Performance Regressions Methods of machine learning (ML) for system deployments without performance regressions are performed by systems and devices. Embodiments herein are directed to cloud-based systems, such as but not limited to, ML systems, database (DB) systems, project development systems, code repository systems, service systems, etc., as well as to client/user systems and/or devices through which a user submits DB queries, determines performance metrics, submits code builds, and/or the like. For example, a cloud-based DB service utilizes a ML service in the determination and/or deployment of safe models used during processing/handling of workloads.

System features often require empirical evidence before they can be deployed to production. This is especially difficult in modern cloud services with faster release cycles and bug fix iterations. The typical practice is to run a subset of production workloads, usually chosen manually using best effort, in a pre-production environment and determine the production readiness from the results. In addition to the design of these pre-production experiments being challenging and costly in terms of time and resources, the issues with typical practices increase with the application of ML to systems, i.e., features that incorporate machine learning models to improve system behavior. These ML-based features can include a large set of models that are often complex and hard to reason about, and as a result, it is difficult to manually design the experiments that identify the safe-to-deploy models that consistently lead to improved system behavior in production.

Embodiments provided overcome several issues with current solutions such as applying ML to systems (e.g., ML-for-Systems) that leverage the large workloads available in modern cloud applications for improving the system performance. Traditional learning over cloud workloads commonly leads to over generalizations that do not capture the large variety of workload patterns. As a result, typical ML-for-System approaches tend to augment performance for some subset of the workload, while risking severe performance regressions in other subsets.

The embodiments herein utilize ML systems to improve the process of designing pre-production experiments to determine safe models for production deployment, predict queries and jobs that are most likely to experience performance regression if the optimized models were to be enabled therefor, and identify and provide changes in the query plans that would lead to the changes in performance. The embodiments also scale to very large workloads by effectively pruning the search space to the most interesting and impactful candidate experiments for pre-production processing, incorporate domain knowledge to compare performances in a meaningful manner, and is general enough for use across different cloud-based systems for safely-deployed newer features, including both learned/optimize and standard/default features. In other words, embodiments employ ML in the design of system experiments for testing new ML-for-Systems features.

As a non-limiting example, consider the cardinality estimation problem for developing query plans against DBs. Cardinality is a key statistic used by query optimizers to pick the physical query plans. However, current cardinality estimators are often inaccurate. For instance, the cardinality estimation in the SCOPE query engine ranges anywhere from 10,000 times under-estimation to 1 million times over-estimation for different query jobs, resulting in query plans that are suboptimal both in performance and resource consumption. This problem is ubiquitous in all modern query engines, such as Spark, SQL Server, PostgreSQL, MySQL, etc. As a result, learning models, such as learning cardinality models, may improve deployed feature performance. Embodiments herein are configured to utilize patterns in workloads, including but not limited to query workloads, to learn multiple small models that are several orders of magnitude more accurate at predicting workload parameters, e.g., cardinalities.

To deploy learned (or optimized) models to production, a testing of their runtime behavior in a pre-production environment that emulates production behavior at a much smaller scale is performed, according to embodiments. That is, an experimentation pipeline is configured to select and rerun a subset of workloads which validates the accuracy of the learned/optimized models and safeguards the performance of the query engine and query optimizer to which deployment is made.

As a non-limiting example, consider a set of ML models, $M=\{m_1, m_2, \ldots, m_p\}$ to be deployed on a set of query scripts, or jobs, $J=\{j_1, j_2, \ldots, j_n\}$. In embodiments, a set of binary variables $A=\{a_{11}, a_{12}, \ldots, a_{ik}\}$ is maintained to indicate whether the $i^{th}$ model is applicable to the $k^{th}$ job or not. However, models learned from previous jobs may lead to performance regression over future jobs, and therefore, given a budget B for the number of jobs to be, or that can be, executed in the pre-production setup/experimentation, a reduced set of candidate jobs is selected to run, whereas, in prior approaches, the determination of candidate jobs was vastly over-inclusive. Embodiments herein are configured to determine the models from candidate jobs that cause performance regression and flag the remaining set of models M' from M for production in a model subset. It should also be noted that that the problems solved by embodiments herein are applicable to a wider set of cloud systems for continual learning from past workloads, and not just query job processing.

Because DB query engines compile user queries into an optimized physical query plan q that can be represented as a Directed Acyclic Graph (DAG), embodiments herein, while not so limited, are described with respect to and/or leverage, these DAG representations of query plans to perform ML and isolate regression causing characteristics. For instance, considering a job $j_i$, a default query plan $q_i$ is generated, and then a model subset m⊂M is applied to produce a second query plan, $q'_i$, that represents a learned or optimized model. Using the experimentation pipeline, these two plans are distinguished before execution by applying a difference model D, such that $D(q_i, q'_i)=θ$. That is, difference model D consumes q and q', producing an estimation of θ, e.g., D represents graph convolution for some experimentation pipeline embodiments. Domain expertise informs the choice of feedback signal θ, which reflects an impactful metric in differentiating query plans. As a non-limiting example, θ is cost of execution when experimenting for illustrative purposes of embodiments herein.

Jobs having optimized or learned models q' that provide impactful differences determined based on D are executed to generate execution data which is in turn utilized to train/re-train difference model D. Subsequently, the impactful jobs noted above are again put through the experimentation pipeline against this updated difference model D to determine a final subset of optimized models that are safe to deploy.

The embodiments herein provide for solutions to issues for machine learning for system deployments by enabling informative, yet comprehensive, pre-production experiment sets of jobs based on a difference model and that meet pre-production budgetary requirements, results of which are used to improve/train the difference model for a final selection of safe-to-deploy models. These and other embodiments for ML for system deployments without performance regressions will be described in further detail below in association with the Figures, and in the Sections/Subsections that follow.

Systems, devices, and apparatuses may be configured in various ways for machine learning for system deployments without performance regressions. For instance, FIG. 1 is a block diagram of a system 100, according to embodiments. System 100 is configured for system deployments using ML without performance regressions, according to embodiments. As shown in FIG. 1, system 100 includes a user device 102, a ML host 104, and a DB host 106. In embodiments, user device 102, ML host 104, and a DB host 106 communicate with each other over a network 112. It should be noted that in various embodiments different numbers of user devices, ML hosts, and/or DB hosts are present. Additionally, according to embodiments, any combination of the systems and/or components illustrated in FIG. 1 are present in system 100.

Network 112 comprises different numbers and/or types of communication links that connect computing devices and hosts/servers such as, but not limited to, the Internet, wired or wireless networks and portions thereof, point-to-point connections, local area networks, enterprise networks, cloud networks, and/or the like, in embodiments.

ML host 104 comprises one or more server computers or computing devices, which include one or more distributed or "cloud-based" servers, in embodiments. In embodiments, ML host 104 is associated with, or is a part of, a cloud-based service platform such as Microsoft® Azure® Machine Learning from Microsoft Corporation of Redmond, Wash., and in some embodiments, ML host 104 comprises an on-premises server(s) in addition to, or in lieu of, cloud-based servers. Various systems/devices herein, such as ML host 104, are configured to perform ML functions/operations for machine learning for system deployments without performance regressions. For instance, ML host 104 includes a ML performance safeguard 110 that is configured to perform functions/operations for machine learning for system deployments without performance regressions, including but without limitation, generating/determining performance metric differences between default models and optimized models based on a difference model, generating subsets of query plans or graphs thereof based on performance metric differences indicating high-impact jobs, training/re-training the difference model based on execution/runtime data, generating further subsets of query plans or graphs thereof based on a re-trained difference model, determining models associated with jobs that correspond to the further subsets, and/or the like.

DB host 106 comprises one or more server computers or computing devices, which include one or more distributed or "cloud-based" servers, in embodiments. In embodiments, DB host 106 is associated with, or is a part of, a cloud-based service platform such as Microsoft® Azure® COSMOS DB from Microsoft Corporation of Redmond, Wash., and in some embodiments, DB host 106 comprises an on-premises server(s) in addition to, or in lieu of, cloud-based servers. Various systems/devices herein, such as DB host 106, are configured to receive requests for executing queries against a DB, and are configured to perform functions/operations for machine learning for system deployments without performance regressions. For instance, in embodiments, DB host 106 includes a DB performance safeguard 108 that is configured to perform functions/operations for machine learning for system deployments without performance regressions, including but without limitation, generating query plans and meta-information for query sets of query jobs, generating node-wise intermediate representations of query plans based on the meta-information, featurizing and formatting data for use with difference models, executing jobs to generate execution/runtime data, deploying safe models, and/or the like.

It should be noted that as described herein, ML host 104 and/or DB host 106 are applicable to any type of system for machine learning for system deployments without performance regressions, as described herein. One example of implementations noted above are network, or "cloud," implementations, applications, or services in a network architecture/platform. A cloud platform includes a networked set of computing resources, including servers, routers, etc., that are configurable, shareable, provide data security, and are accessible over a network such as the Internet, according to embodiments. Cloud applications/services such as ML servers and DB servers, etc., are configured to run on these computing resources, often atop operating systems that run on the resources, for entities that access the applications/services, locally and/or over the network. A cloud platform is configured to support multi-tenancy, where cloud platform-based software services multiple tenants, with each tenant including one or more users who share common access to software services of the cloud platform. Furthermore, a cloud platform is configured to support hypervisors implemented as hardware, software, and/or firmware that run virtual machines (emulated computer systems, including operating systems) for tenants. A hypervisor presents a virtual operating platform for tenants.

User device 102 in different embodiments is any number, type, or combination of computing devices or computing systems, including a terminal, a personal computer, a laptop computer, a tablet device, a smart phone, a personal digital assistant, a server(s), a gaming console, and/or the like, including internal/external storage devices, that are utilized to execute functions/operations described herein for machine learning for system deployments without performance regressions, as well as for performing client-side functions/operations of client-server scenarios associated with embodiments such as providing query jobs to a DB host. User device 102 also includes additional components (not shown for brevity and illustrative clarity) including, but not limited to, components and subcomponents of other devices and/or systems herein, in embodiments.

ML host 104 and/or DB host 106 are configured in various ways for machine learning for system deployments without performance regressions. For instance, referring now to FIG. 2, a block diagram of a system 200 is shown for machine learning for system deployments without performance regressions, according to an example embodiment. System 200 is configured to be an embodiment of system 100 of FIG. 1, e.g., DB host 106. System 200 is described as follows.

Figure 2:
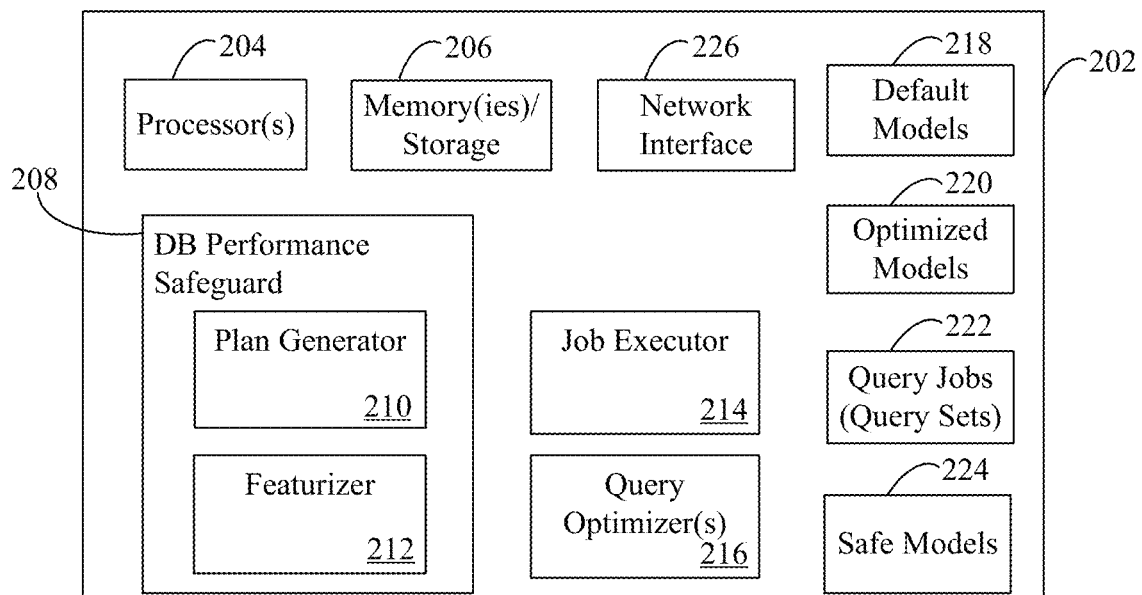
FIG. 2 shows a block diagram of a computing system configured for system deployments using ML without performance regressions, according to an example embodiment.

System 200 includes a computing system 202, which is an embodiment of DB host 106 of FIG. 1, in embodiments, and which is any type of server or computing system, as mentioned elsewhere herein, or as otherwise known. As shown in FIG. 2, computing system 202 includes one or more processors ("processor") 204, one or more of a memory and/or other physical storage device ("memory") 206, as well as one or more network interfaces ("network interface") 226. Computing system 202 includes a DB performance safeguard 208 that is an embodiment of DB performance safeguard 108 of FIG. 1. DB performance safeguard 208 is configured to perform aspects of machine learning for system deployments without performance regressions, as described herein, including but without limitation, generating query plans and meta-information for query sets of query jobs, generating node-wise intermediate representations of query plans based on the meta-information, featurizing and formatting data for use with difference models, executing jobs to generate execution/runtime data, deploying safe models, and/or the like. In embodiments, DB performance safeguard 208 comprises a portion of a DB server application/service. Computing system 202 also includes a job executor 214 configured to execute query jobs, e.g., query jobs 222, and a query optimizer(s) 216 (as part of, or separate from, job executor 214) configured to generate query plans for executing query jobs, in embodiments. Job executor 214 and/or query optimizer(s) 216 may comprise the same service/system/component as DB performance safeguard 208, according to some embodiments.

System 200 also includes additional components (not shown for brevity and illustrative clarity) including, but not limited to, components and subcomponents of other devices and/or systems herein, as well as those described below with respect to FIGS. 9-10, according to embodiments.

Processor 204 and memory 206 may respectively be any type of processor circuit(s) and memory that is described herein, and/or as would be understood by a person of skill in the relevant art(s) having the benefit of this disclosure. Processor 204 and memory 206 may each respectively comprise one or more processors or memories, different types of processors or memories (e.g., at least one cache for query processing), remote processors or memories, and/or distributed processors or memories. Processor 204 may be multi-core processors configured to execute more than one processing thread concurrently. Processor 204 may comprise circuitry that is configured to execute computer program instructions such as, but not limited to, embodiments of DB performance safeguard 208, including one or more of the components thereof as described herein, job executor 214, and/or query optimizer(s) 216, which may be implemented as computer program instructions, as described herein.

Memory 206 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, DB performance safeguard 208, including one or more of the components thereof as described herein, job executor 214, and/or query optimizer(s) 216, models of default models 218, optimized models 220, and/or safe models 224, jobs of query jobs 222, generated query plans and representations thereof, meta-information, query features, execution data, and/or the like.

Network interface 226 may be any type or number of wired and/or wireless network adapter, modem, etc., configured to enable system 200, including computing system 202, to communicate with other devices and/or systems over a network, such as communications between computing system 202 and other devices, systems, hosts, of system 100 in FIG. 1 over a network such as network 112.

DB performance safeguard 208 of computing system 202 may include a plurality of components for performing the functions and operations described herein for machine learning for system deployments without performance regressions. As illustrated, DB performance safeguard 208 includes a plan generator 210 and a featurizer 212, although additional components, as described herein or otherwise, are also include in some embodiments.

Plan generator 210 is configured to receive default models 218, optimized models 220, and/or query jobs 222 during operation to generate query plans and meta-information for query sets of query jobs. For example, query jobs 222 includes a set of prior production jobs having one or more of default models 218 and/or optimized models 220 associated therewith. That is, each of query jobs 222 may have a query plan(s) generated with one or more default models and/or one or more optimized, or learned, models. Default and optimized query plans (e.g., as DAGs) for jobs are generated based on the inputs, along with meta-information for nodes of the graphs. Featurizer 212 is configured to generate node-wise intermediate representations of query plans, e.g., the graphs) based on the meta-information, and to featurize and format data for use with difference models. Plan generator 210 and/or featurizer 212 are a part of query optimizer(s) 216, or vice versa, according to some embodiments.

After generation of a subset of jobs via a difference model, as described herein, job executor 214 is configured to execute the jobs in the subset to generate execution data therefor. The execution data is provided to train/retrain the difference model (that generated the subset) which subsequently generates a further subset of jobs, optimized models of which are determined for deployment as safe models 224 which may be stored by system 200.

The difference model, subset generation, training/retraining of the difference model, and/or further subset generation are performed by a ML host, e.g., ML host 104 in system 100 of FIG. 1, according to embodiments.

Figure 3:
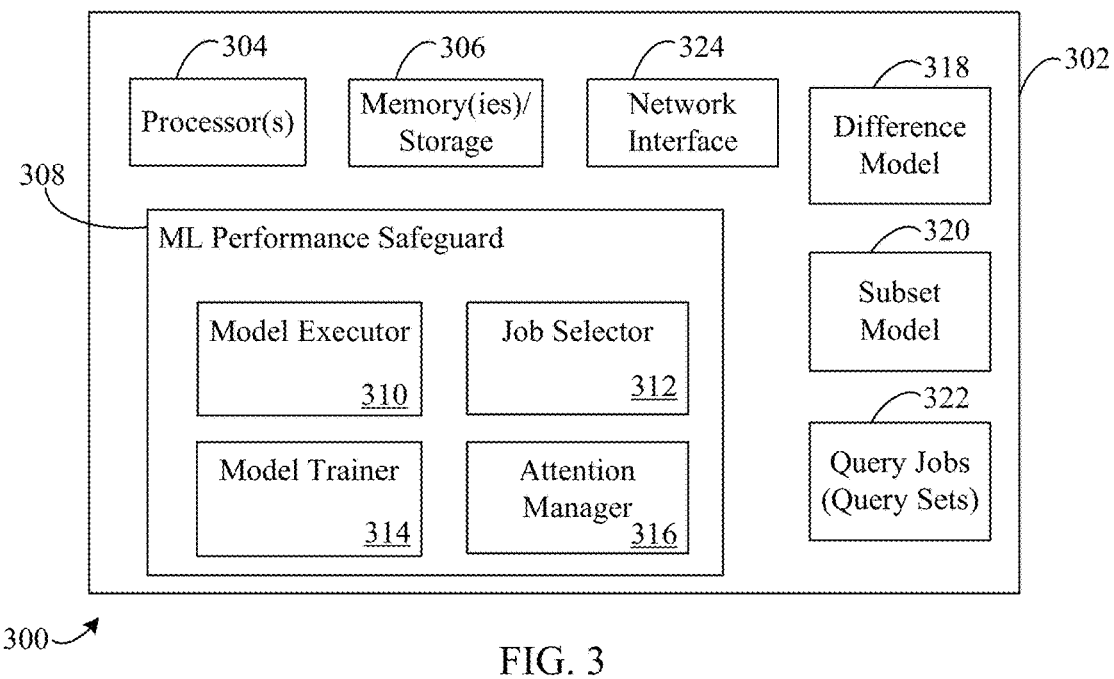
FIG. 3 shows a block diagram of a computing system configured for system deployments using ML without performance regressions, in accordance with an example embodiment.

For example, FIG. 3 shows a block diagram of a system 300 for machine learning for system deployments without performance regressions that is an embodiment of ML host 104 of FIG. 1. System 300 is described as follows.

System 300 includes a computing system 302, which is an embodiment of ML host 104 of FIG. 1, in embodiments, and which is any type of server or computing system, as mentioned elsewhere herein, or as otherwise known. As shown in FIG. 3, computing system 302 includes one or more processors ("processor") 304, one or more of a memory and/or other physical storage device ("memory") 306, as well as one or more network interfaces ("network interface") 324. Computing system 302 includes a ML performance safeguard 308 that is an embodiment of ML performance safeguard 110 of FIG. 1. ML performance safeguard 308 is configured to perform aspects of machine learning for system deployments without performance regressions, as described herein, including but without limitation, generating/determining performance metric differences between default models and optimized models based on a difference model, generating subsets of query plans or graphs thereof based on performance metric differences indicating high-impact jobs, training/re-training the difference model based on execution/runtime data, generating further subsets of query plans or graphs thereof based on a re-trained difference model, determining models associated with jobs that correspond to the further subsets, and/or the like. In embodiments, ML performance safeguard 308 comprises a portion of a ML server application/service.

System 300 also includes additional components (not shown for brevity and illustrative clarity) including, but not limited to, components and subcomponents of other devices and/or systems herein, as well as those described below with respect to FIGS. 9-10, according to embodiments.

Processor 304 and memory 306 may respectively be any type of processor circuit(s) and memory that is described herein, and/or as would be understood by a person of skill in the relevant art(s) having the benefit of this disclosure. Processor 304 and memory 306 may each respectively comprise one or more processors or memories, different types of processors or memories (e.g., at least one cache for query processing), remote processors or memories, and/or distributed processors or memories. Processor 304 may be multi-core processors configured to execute more than one processing thread concurrently. Processor 304 may comprise circuitry that is configured to execute computer program instructions such as, but not limited to, embodiments of ML performance safeguard 308, including one or more of the components thereof as described herein, which may be implemented as computer program instructions, as described herein.

Memory 306 may include volatile storage portions such as a random access memory (RAM) and/or persistent storage portions such as hard drives, non-volatile RAM, and/or the like, to store or be configured to store computer program instructions/code as described herein, as well as to store other information and data described in this disclosure including, without limitation, ML performance safeguard 308, including one or more of the components thereof as described herein, a difference model 318, a subset model 320, query jobs 322 which may be an embodiment of query jobs 222 of system 200, generated query plans and representations thereof, meta-information, query features, execution data, and/or the like.

Network interface 324 may be any type or number of wired and/or wireless network adapter, modem, etc., configured to enable system 300, including computing system 302, to communicate with other devices and/or systems over a network, such as communications between computing system 302 and other devices, systems, hosts, of system 100 in FIG. 1 over a network such as network 112.

ML performance safeguard 308 of computing system 302 may include a plurality of components for performing the functions and operations described herein for machine learning for system deployments without performance regressions. As illustrated, ML performance safeguard 308 includes a model executor 310, a job selector 312, a model trainer 314, and/or an attention manager 316, in embodiments, although additional components, as described herein or otherwise, are also include in some embodiments.

Model executor 310 is configured to receive query features and query plans/graphs from DB performance safeguard 208 and to execute difference model 318 against the default and optimized graphs received for given query jobs (e.g., an initial set of jobs, a subset of jobs, etc., as described herein). Query plans/graphs are associated with, and may be stored with, respective jobs of query jobs 322. Job selector 312 is configured to determine/select jobs of query jobs 322 for which optimized/learned query models provide for impactful performance metric, e.g., execution cost, and generate subsets of jobs having an impact that meets or exceeds a threshold value for the performance metric according to subset model 320. Model trainer 314 is configured to train/re-train difference model 318 based on execution data from executed jobs in the subset determined by job selector 312. Model executor 310 and/or job selector 312 are configured to perform their functions before and after the training/re-training of difference model 318. Attention manager 316 is configured to determine attention, or importance scores, for nodes of query plan graphs based on the output of model executor 310.

As noted above for FIGS. 1-3, embodiments herein provide for machine learning for system deployments without performance regressions. System 100 of FIG. 1, system 200 of FIG. 2, and system 300 of FIG. 3 may each be configured to perform such functions and operations. It is further contemplated that the systems and components described above are configurable to be combined in any way. For example, system 200 and system 300 may comprise a portion of a cloud-based platform and/or may be combined together as a single system, according to embodiments.

Figure 4:
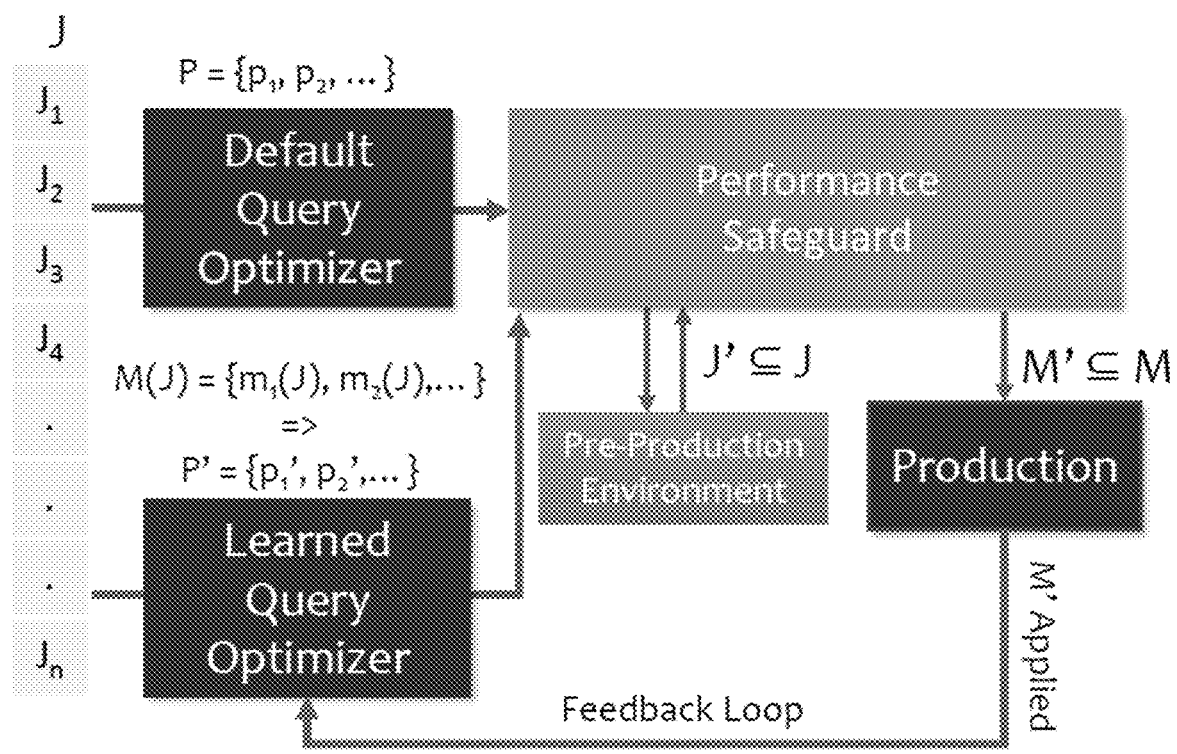
FIG. 4 shows a flow diagram for system deployments using ML without performance regressions, in accordance with an example embodiment.

FIG. 4 will now be described. FIG. 4 shows a flow diagram 400 for machine learning for system deployments without performance regressions, according to example embodiments. System 200 in FIG. 2 and system 300 of FIG. 3 operate according to flow diagram 400, in embodiments. Further structural and operational examples will be apparent to persons skilled in the relevant art(s) based on the following descriptions. While components of flow diagram 400 are shown separately for illustration and ease of description, this representation is non-limiting and components are contemplated as being grouped, combined, etc., in any combination or structure. Flow diagram 400 is described as follows with respect to system 200 of FIG. 2 and system 300 of FIG. 3.

In flow diagram 400, a plurality of n jobs, previously executed, $J=\{J_1, J_2, \ldots, J_n\}$ is provided to a default query optimizer and a learned query optimizer. These query optimizers may be ones of query optimizer(s) 216, and are used in conjunction with, or as part of, plan generator 210 of FIG. 2. For each of jobs J, one or more of a set of default models, $DM=\{dm_1, dm_2, \ldots, dm_p\}$ may be associated (e.g., corresponding to default models 218), and one or more of a set of ML models, $M=\{m_1, m_2, \ldots, m_p\}$ may be associated (e.g., corresponding to optimized models 220). The default query optimizer and the learned query optimizer are configured to respectively generate query plans $P=\{p_1, p_2, \ldots\}$ and $P'=\{p_1', p_2', \ldots\}$ for jobs J, where query plans of P' are associated with models of M used to execute jobs of J. In embodiments, query plans of P and P' are represented as physical models or graphs (DAGs).

The query optimizers provide plans P and P', and associated information, to a performance safeguard, e.g., corresponding to DB performance safeguard 208 of system 200 in FIG. 2 and ML performance safeguard 308 of system 300 in FIG. 3. In embodiments, the performance safeguard utilizes a difference model that identifies jobs of J for which an associated ML model m of M is determined to have a performance impact that exceeds, to a specified degree, the performance impact of an associated default model dm of DM. A subset J' of J is generated to include these jobs, and J' are provided to a pre-production environment for execution. Alternatively, job subset J' is determined by negatively impactful performance metric(s) over jobs J, thus removing poorly performing optimizer models before deployment.

As noted above, pre-production environment may be limited according to a budget B in which the number of jobs to be, or that can be, executed, time, resources available, monetary costs, and/or the like are factored. Therefore, subset J' represents a smaller number of jobs that have initially been determined as positively impactful for a performance metric over jobs J, and thus provide an increased likelihood of improving performance while also requiring less pre-production time, resources, costs, etc., to remain within the pre-production budget.

The execution data of jobs J' in the pre-production phase are provided back to the performance safeguard. The execution data is used to train/re-train the difference model, and the updated difference model is executed for jobs of J'. The ML models m of M for jobs of J' that continue to be positively impactful for the performance metric are determined, and their associated ML models are used to generate a ML model subset M' from M, corresponding to safe models for deployment. The subset M' is deployed into production and applied to the learned query optimizer.

Accordingly, this feedback via the performance safeguard continually improves production deployments of models/features for systems as well as the models that utilized to determine which models/features are deployed for workloads.

FIG. 4 will now be described. FIG. 4 shows a flow diagram 400 for machine learning for system deployments without performance regressions, according to example embodiments. System 200 in FIG. 2 and system 300 of FIG. 3 operate according to flow diagram 400, in embodiments. Further structural and operational examples will be apparent to persons skilled in the relevant art(s) based on the following descriptions. While components of flow diagram 400 are shown separately for illustration and ease of description, this representation is non-limiting and components are contemplated as being grouped, combined, etc., in any combination or structure. Flow diagram 400 is described as follows with respect to system 200 of FIG. 2 and system 300 of FIG. 3.

In flow diagram 400, a plurality of n jobs, previously executed, $J=\{J_1, J_2, \ldots, J_n\}$ is provided to a default query optimizer and a learned query optimizer. These query optimizers may be ones of query optimizer(s) 216, and are used in conjunction with, or as part of, plan generator 210 of FIG. 2. For each of jobs J, one or more of a set of default models, $DM=\{dm_1, dm_2, \ldots, dm_p\}$ may be associated (e.g., corresponding to default models 218), and one or more of a set of ML models, $M=\{m_1, m_2, \ldots, m_p\}$ may be associated (e.g., corresponding to optimized models 220). The default query optimizer and the learned query optimizer are configured to respectively generate query plans $P=\{p_1, p_2, \ldots\}$ and $P'=\{p_1', p_2', \ldots\}$ for jobs J, where query plans of P' are associated with models of M used to execute jobs of J. In embodiments, query plans of P and P' are represented as physical models or graphs (DAGs).

With the query plans is generated meta-information associated with therewith. The query optimizers then utilize the meta-information and the query plan graphs to generate a node-wise intermediate representation of each of the query plan graphs. The query optimizers provide plans P and P', and the intermediate representations, to a performance safeguard, e.g., corresponding to DB performance safeguard 208 of system 200 in FIG. 2 and ML performance safeguard 308 of system 300 in FIG. 3, according to embodiments. Featurizer 212 of DB performance safeguard 208 featurizes the jobs based on their associated intermediate representations for with difference model 318 of FIG. 3, in embodiments.

Figure 5:
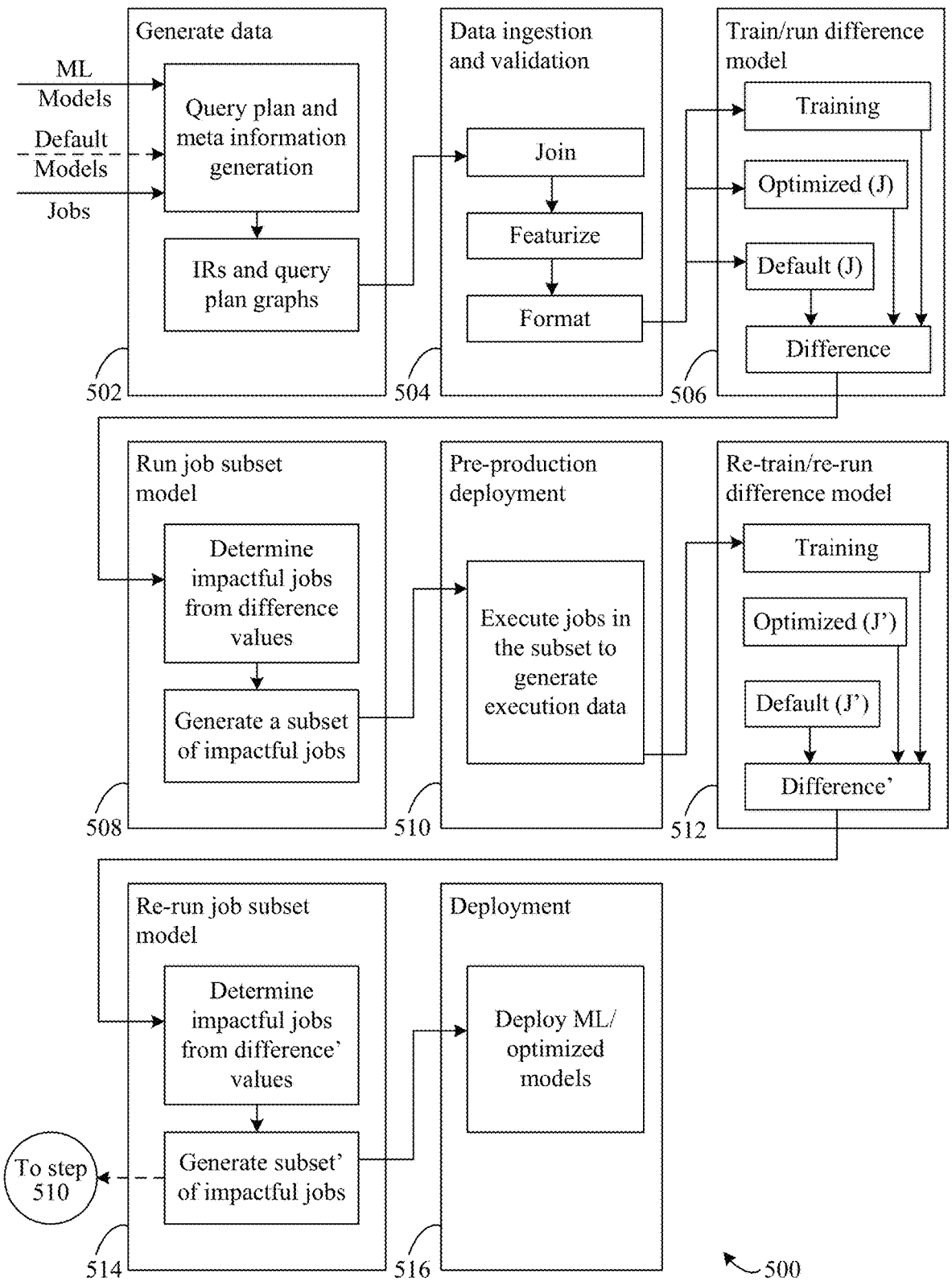
FIG. 5 shows a flow diagram for system deployments using ML without performance regressions, in accordance with an example embodiment.

FIG. 5 will now be described in the context of system 200 in FIG. 2, system 300 of FIG. 3, and flow diagram 400 of FIG. 4. FIG. 5 shows a flow diagram 500 for machine learning for system deployments without performance regressions, according to example embodiments. System 200 in FIG. 2 and system 300 of FIG. 3 operate according to flow diagram 500, in embodiments. Further structural and operational examples will be apparent to persons skilled in the relevant art(s) based on the following descriptions. Flow diagram 500 is an embodiment of flowchart 400 of FIG. 4. Flow diagram 500 is described as follows.

Flow diagram 500 begins with step 502. In step 502, data is generated. For example, system 202 and/or DB performance safeguard 208 may generate data, where ML models/optimized models and previously-run jobs (e.g., sets of queries of query jobs) are provided to generate data such as query plans of the input jobs and associated information such as meta-information. In embodiments, default models are also provided, while in other embodiments, default models may reside in plan generator 210/query optimizer(s) 216. Query plan graphs of the query plans are generated, and intermediate representations (IRs) of nodes of the graphs are generated based on the graphs and the meta-information. Put another way, a combination of raw data from the two sourced query plans is combined by first merging the node-level features into an intermediate representation (IR) while keeping the physical plans as graph structures.

In step 504, data ingestion and validation is performed. For instance, featurizer 212 of system 202 ingests data and performs validation thereof. The IRs and query plan graphs generated in step 502 are provided as input data to featurizer 212, which joins, featurizes, and formats the data to be used by difference model 318 and model executor 310. As a non-limiting example, for a job $j_i$, let $I_{1i}$ and $I_{2i}$ be the IRs for physical query plan graphs $q_{1i}$ and $q_{2i}$. Each job $j_i$ is featurized by first matrix multiplying $I_{1i}$ and $I_{2i}$, and then flattening the resulting matrix $m_i = I_{1i} \times I_{2i}$ into a long, onedimensional vector $v_i$. Finally, a fixed bin histogram, e.g., of size 20, is performed on $v_i$ to create a feature $f_i$. In summary of this example:

$$f_i = \sum_{j=1}^{20} hist(I_1^i \times I_2^i). \quad \text{(Equation 1)}$$

The query plan graphs and features $f_i$ for each job $j_i$ are then provided as outputs to step 504.

In step 506, the difference model is trained and/or run. For example, model trainer 314 is configured to train/re-train the difference model, and model executor 310 of ML performance safeguard 308 of system 300 in FIG. 3 is configured to run difference model 318. The query plan graphs and features f for each job $j_i$ are provided as inputs to step 506. Difference model 318 is run against the optimized query plan graph and the default query plan graph for each job, and for each pair of graphs per job, a difference in a performance metric of the job is determined by model executor 310 according to difference model 318 as a difference score.

Difference model 318 leverages data from both the physical query plan graph structure ($q_1^i$ and $q_2^i$ each job $j_i$) and the IRs ($I_1^i$ and $I_2^i$ each job $j_i$), unlike models which only use the featurized IRs ($f_i$ for each job $j_i$). Difference model 318 ("D" below) is based on a graph convolution network across a set of workload jobs J, in embodiments, as, for example:

$$\forall J \rightarrow D(q_1^i, q_2^i, I_1^i, I_2^i). \quad \text{(Equation 2)}$$

The convolutional architecture is modified from any prior approaches while still calculating a difference (or difference derived from similarity) score for two DAGs.

In step 508, the job subset model is run. For instance, job selector 312 of ML performance safeguard 308 of system 300 in FIG. 3 is configured to run subset model 320 based on the difference score. In embodiments, subset model 320 includes a threshold value for comparison to the difference score such that meeting, or exceeding, the threshold value by the difference score indicates that the associated job is to be included for generation of a subset of the jobs that provide a performance metric impact. In embodiments, subset model 320 is based on the budget (also constraints) of the pre-production environment, e.g., the number of jobs that can or could be re-run, the maximum size of each job, etc. In other words, subset selection according to subset model 320 is a constraint based selection in some embodiments. For the difference score of each job determined in step 506, subset model 320 is applied by job selector 312 to select the impactful jobs for the subset of jobs.

In step 510, pre-production deployment is performed. For example, query jobs in the subset generated in step 508 are executed to generate execution data. In embodiments, job executor 214 of system 200 in FIG. 2 is configured to execute the query jobs of the subset of jobs in a pre-deployment environment. The execution data includes data associated with the performance metric used for the described embodiments. As an example, the performance metric may be cost of execution, and therefore, the execution data includes actual cost of execution information for the executed jobs from the subset of jobs generated in step 508.

In step 512, the difference model is re-trained and/or re-run. For instance, model executor 310 as noted above is configured to run difference model 318, and is also configured to re-run difference model 318, however, in step 512, the difference model is first trained/re-trained based on the execution data generated in step 510. Model trainer 314 is configured to train/re-train the difference model to generate an updated difference model as difference model 318. Accordingly, the accuracy of the updated difference model is improved over the initial difference model 318. The query plan graphs and features $f_i$ for each job $j_i$ of the subset of jobs, rather than all jobs, are used against the execution of the updated difference model in step 512. That is, the actual execution data for the observed performance metric is utilized to train/re-train difference model 318 before it is run against the optimized query plan graph and the default query plan graph for each job in the subset. For each job in the subset of jobs, and for each pair of graphs per job in the subset, an updated difference in the performance metric of the job is determined by model executor 310 according to the updated difference model 318 as an updated difference score.

In step 514, the job subset model is re-run. For example, job selector 312 is configured to run subset model 320 based on the updated difference score from step 512, which is based on the updated difference model 318 that is trained/re-trained on actual execution data for the performance metric. For the updated difference score of each job from the subset of jobs determined in step 512, subset model 320 is applied by job selector 312 to select the jobs that remain as impactful jobs from the subset of jobs. Those jobs that remain impactful are included in the generation of a further, or updated, subset from the initial subset of jobs in step 506. The ML/optimized models of the further, or updated, subset of jobs are thus determined for deployment.

In embodiments, at least one of step 510, step 512, or step 514 are iteratively performed one or more additional times prior to flow diagram 500 proceeding to step 516. That is, additional subsets may be iteratively generated according to step 514, and these additional subsets are executed according to step 510. Put another way, step 510, step 512, and step 514 comprise an iterative, nested loop in the pipeline of flow diagram 500 that provides the ability to further train and improve difference model 318 for the selection of the best candidate jobs to be selected for a final subset of jobs from which safe, ML/optimized models are deployed.

In step 516, deployment is performed. For instance, the jobs of the further, or updated, subset in step 514 have associated therewith ML/optimized models that have been determined as impactful through the embodiments described herein, and that are thus deemed safe models for deployment. These ML/optimized models are deployed to production for a query optimizer, e.g., query optimizer(s) 216 of system 200 as a learned/optimized model. The safe models are deployed from system 200 and/or from system 300 in different embodiments.

Example performance results of the embodiments described herein in view of prior approaches are provided in Table 1. In this empirical example, an Extreme Gradient Boosting method and a deep neural network were compared against the difference model described for the embodiments herein. As noted above, the difference model of the embodiments is based on physical and featurized job parameters, while the other methods only rely on the featurized portion of a given job to predict normalized differences in performance metrics. Table 1 is shown below with results based on the methods being trained on 3000 production query job pairs and tested with 100 job pairs.

TABLE 1

Example Performance of Approaches

| Method\Accuracy Metric | MSE | MAE | $R^2$ Score |
| --- | --- | --- | --- |
| Extreme Gradient Boosting | 0.09 | 0.22 | 0.19 |
| Deep Neural Network (DNN) | 0.13 | 0.27 | 0 |
| Difference Model | 0.09 | 0.26 | 0.04 |

Table 1 provides values for the following accuracy metrics: Mean Squared Error (MSE), Mean Absolute Error (MAE), and $R^2$ variance.

As shown, the Boosting method outperforms the DNN which, based on the $R^2$ variance, does not adequately handle variance in the data. The difference model, however, outperforms the Boosting method. Additionally, the difference model learns node embeddings, further aggregating the embeddings to formulate graph embeddings for the two query graph structures analyzed thereby. With these node-embeddings, node-wise importance scores, or attention, are provided for physical operators in the query plans. This attention mechanism further allows domain experts to understand the model performance at a granular level. In embodiments, the importance scores, or attention, is generated by attention manager 316 of system 300 in FIG. 3.

For the difference model of the described embodiments, the pair-wise node histogram from traditional convolution architectures is removed, and a tanh operator is used in place of the traditional sigmoid operator for the activation function to produce normalized values from [−1, 1]. With this modification, the predicted difference between query plans is better understood. For instance, query plans scored from [−1, 0] are predicted to be different with performance regression, while plans scored from [0, 1] are different with performance improvement. Scores near 0 show plan similarity. In embodiments, this normalization allows for interoperability between different systems and performance metrics such that subset model 320 and job selector 312 of system 300 are enabled to consistently select positively impactful models with respect to each other, regardless of the actual system implementations and reference values of performance metrics considered.

Figure 6:
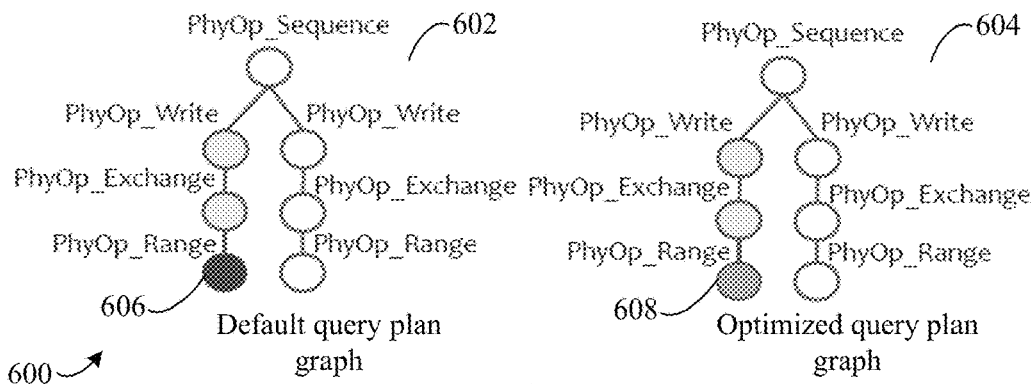
FIG. 6 shows a diagram of query plan graphs for system deployments using ML without performance regressions, in accordance with an example embodiment.

For instance, referring now to FIG. 6, a diagram of query plan graphs ("graphs") 600 showing machine learning for system deployments without performance regressions is illustrated, according to example embodiments. Graphs 600 includes a default query plan graph 602 and an optimized query plan graph 604. Default query plan graph 602 and optimized query plan graph 604 are non-limiting and exemplary in nature, and serve only for purposes of illustration with respect to various embodiments contemplated herein.

As shown in graphs 600, nodes of default query plan graph 602 and optimized query plan graph 604 are denoted, illustrated as colored/shaded in FIG. 6, by the attention mechanism, e.g., attention manager 316 of system 300 in FIG. 3 to demonstrate relative node importances. In this example, the importance scores of corresponding nodes are the same or similar with the exception of a node 606 in default query plan graph 602 and a corresponding node 608 optimized query plan graph 604 which has a higher or greater importance score, where the greater importance score is greater by a variation value, here, a positive variation value indicating a positive impact with respect to the performance metric. In embodiments, the variation value, one or more factors, and/or indicia of the factors that cause the corresponding node 608 of optimized query plan graph 604 to have a higher importance score are provided in an output report for review by administrators/developers, e.g., via display of a computing device, in a log file, and/or the like. In other embodiments, it is contemplated that the variation value is negative where the importance score of corresponding node 608 is less than that of node 606 (a regressive impact), or where the importance scores are the same and the variation value is zero (i.e., no variation or impact change). In any of these three scenarios, the output report provides useful information about the impact of optimized query plan graph 604 as compared to default query plan graph 602.

In view of this distinction, and referring back to the example described above for Table 1, the difference model is trained on the same set of 3000 jobs as the other two methods, but the default query plan graph 602 and optimized query plan graph 604 score as 0.63702 on a [−1, 1] scale by the difference model, i.e., the optimized query plan provides a substantial positive impact for the performance metric. The physical operators for default query plan graph 602 and optimized query plan graph 604 are the same, and thus, a manual plan comparison would perceive them as identical. However, the IRs $I_a$ and $I_b$, for default query plan graph 602 and optimized query plan graph 604, respectively, contain different meta-information for the highlighted nodes, which are isolated via the attention mechanism by attention manager 316, and this explains the plan difference score of 0.63702. Thus, the difference model described herein not only outperforms the Boost method, but it also provides an attention mechanism for interpretability via output reports. The interpreted output reports are used to adjust one or more aspects of the processes and functions described herein for improved convergence rate, system performance, etc., in embodiments.

Figure 7:
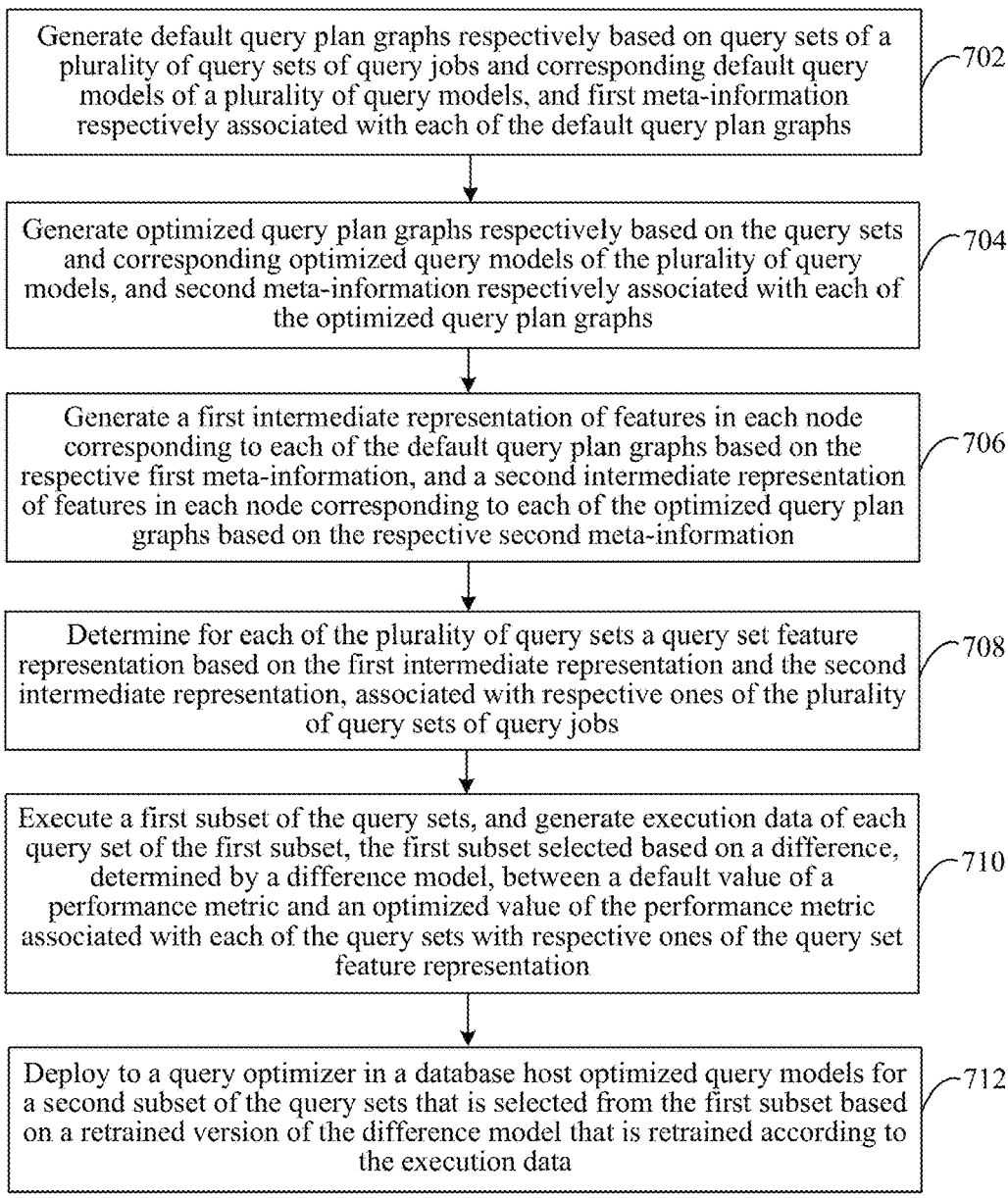
FIG. 7 shows a flowchart for system deployments using ML without performance regressions, in accordance with an example embodiment.

FIG. 7 shows a flowchart 700 for machine learning for system deployments without performance regressions, according to example embodiments. System 200 in FIG. 2 and system 300 of FIG. 3 may operate according to flowchart 700, in embodiments. Further structural and operational examples will be apparent to persons skilled in the relevant art(s) based on the following descriptions. Flowchart 700 may be an embodiment of flow diagram 400 of FIG. 4 and/or flow diagram 500 of FIG. 5. Flowchart 700 is described as follows with respect to system 200 of FIG. 2 and system 300 of FIG. 3.

Flowchart 700 begins at step 702. Step 702 provides for generating default query plan graphs respectively based on query sets of a plurality of query sets of query jobs and corresponding default query models of a plurality of query models, and first meta-information respectively associated with each of the default query plan graphs. For example, plan generator 210 and/or query optimizer(s) 216 of system 200 of FIG. 2 are configured to generate default query plan graphs and associated meta-information in step 702, as described herein.

Step 704 provides for optimized query plan graphs respectively based on the query sets and corresponding optimized query models of the plurality of query models, and second meta-information respectively associated with each of the optimized query plan graphs. For instance, plan generator 210 and/or query optimizer(s) 216 are also configured to generate optimized query plan graphs and associated meta-information in step 704, based on previously executed jobs and corresponding optimized models, as described herein.

Step 706 provides for generating a first intermediate representation of features in each node corresponding to each of the default query plan graphs based on the respective first meta-information, and a second intermediate representation of features in each node corresponding to each of the optimized query plan graphs based on the respective second meta-information. For example, plan generator 210 and/or query optimizer(s) 216 are also configured to generate IRs that represent nodes in the default and optimized query plan graphs based on associated meta-information in step 706, as described herein.

Step 708 provides for determining for each of the plurality of query sets a query set feature representation based on the first intermediate representation and the second intermediate representation, associated with respective ones of the plurality of query sets of query jobs. For instance, in step 708, featurizer 212 of system 200 of FIG. 2 is configured to determine feature representations for each query set based on the IRs of the default and optimized query plan graphs of each of the query sets generated in step 706, as described herein.

Step 710 provides for executing a first subset of the query sets and generating execution data of each query set of the first subset, the first subset selected based on a difference, determined by a difference model, between a default value of a performance metric and an optimized value of the performance metric associated with each of the query sets with respective ones of the query set feature representation. For example, job executor 214 of system 200 of FIG. 2 is configured to execute query sets in a first subset of query sets as generated by system 300 of FIG. 3 based on difference model 318 and subset model 320, as described herein.

Step 712 provides for deploying to a query optimizer in a database host optimized query models for a second subset of the query sets that is selected from the first subset based on a retrained version of the difference model that is retrained according to the execution data. For instance, system 200 or system 300 of FIG. 3 are configured to deploy to query optimizer(s) 216 optimized query models determined to be safe and/or deployed by system 300, which may be stored as safe models 224 of system 200, as described herein.

Figure 8:
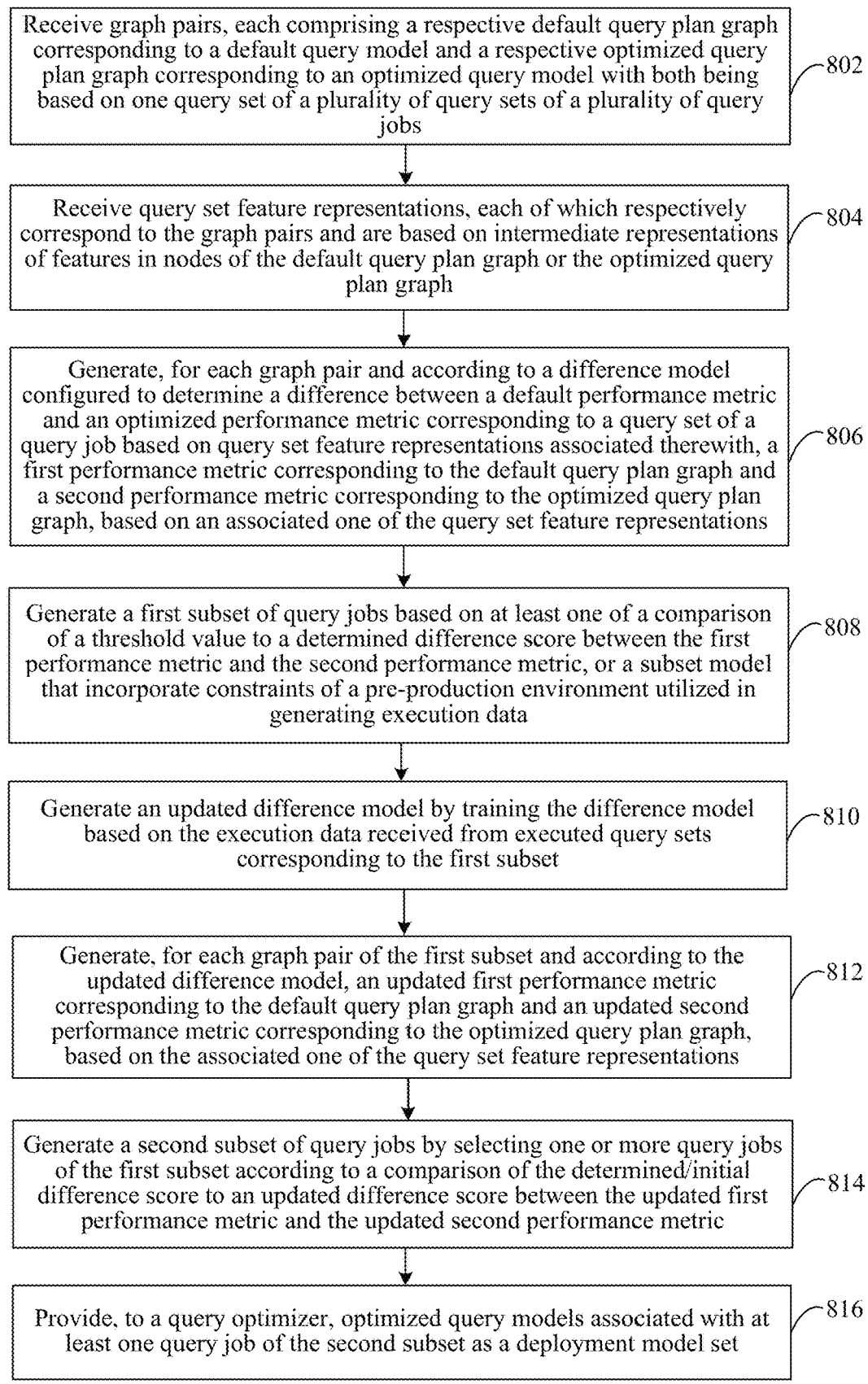
FIG. 8 shows a flowchart for system deployments using ML without performance regressions, in accordance with an example embodiment.

FIG. 8 shows a flowchart 800 for machine learning for system deployments without performance regressions, according to example embodiments. System 200 in FIG. 2 and system 300 of FIG. 3 may operate according to flowchart 800, in embodiments. Further structural and operational examples will be apparent to persons skilled in the relevant art(s) based on the following descriptions. Flowchart 800 may be an embodiment of flow diagram 400 of FIG. 4 and/or flow diagram 500 of FIG. 5. Flowchart 800 is described as follows with respect to system 200 of FIG. 2 and system 300 of FIG. 3.

Flowchart 800 begins at step 802. Step 802 provides for receiving graph pairs, each comprising a respective default query plan graph corresponding to a default query model and a respective optimized query plan graph corresponding to an optimized query model with both being based on one query set of a plurality of query sets of a plurality of query jobs. For example, model executor 310 of system 300 in FIG. 3 is configured to receive graph pairs in step 802 that are generated by system 200 of FIG. 2, e.g., by plan generator 210 and/or query optimizer(s) 216, as described herein.

Step 804 provides for receiving query set feature representations, each of which respectively correspond to the graph pairs and are based on intermediate representations of features in nodes of the default query plan graph or the optimized query plan graph. For instance, model executor 310 is also configured to receive query set feature representations in step 804 that are generated by system 200 of FIG. 2, e.g., by featurizer 212, as described herein.

Step 806 provides for generating, for each graph pair and according to a difference model configured to determine a difference between a default performance metric and an optimized performance metric corresponding to a query set of a query job based on query set feature representations associated therewith, a first performance metric corresponding to the default query plan graph and a second performance metric corresponding to the optimized query plan graph, based on an associated one of the query set feature representations. For example, model executor 310 is also configured to generate first performance metrics in step 806 based on difference model 318, as described herein.

Step 808 provides for generating a first subset of query jobs based on at least one of a comparison of a threshold value to a determined difference score between the first performance metric and the second performance metric, or a subset model that incorporate constraints of a pre-production environment utilized in generating execution data. For instance, in step 808, job selector 312 of system 300 in FIG. 3 is configured to generate a first subset of query jobs based on subset model 320, as described herein.

Subset Model 320

Step 810 provides for training an updated difference model by training the difference model based on the execution data received from executed query sets corresponding to the first subset. For example, model trainer 314 of system 300 in FIG. 3 is configured to train/re-train (both "training") difference model 318 based on actual performance metric information in execution data of the executed first subset of jobs received from system 200 of FIG. 2, as described herein, in step 810.

Step 812 provides for generating, for each graph pair of the first subset and according to the updated difference model, an updated first performance metric corresponding to the default query plan graph and an updated second performance metric corresponding to the optimized query plan graph, based on the associated one of the query set feature representations. For instance, model executor 310 is also configured to generate second performance metrics in step 812 based on the updated version of difference model 318 of step 810, as described herein.

Step 814 provides for generating a second subset of query jobs by selecting one or more query jobs of the first subset according to a comparison of the determined/initial difference score to an updated difference score between the updated first performance metric and the updated second performance metric. For example, in step 814, job selector 312 is also configured to generate a second subset of query jobs from the first subset based on subset model 320 and outputs of the updated version of difference model 318, as described herein.

Step 816 provides for providing, to a query optimizer, optimized query models associated with at least one query job of the second subset as a deployment model set. For instance, system 300 is configured to provide the optimized query models for jobs in the second subset to query optimizer(s) 216 of system 200 in FIG. 2.

III. Example Mobile and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 of FIG. 1, system 200 of FIG. 2, system 300 of FIG. 3, and graphs 600 of FIG. 6, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 9:
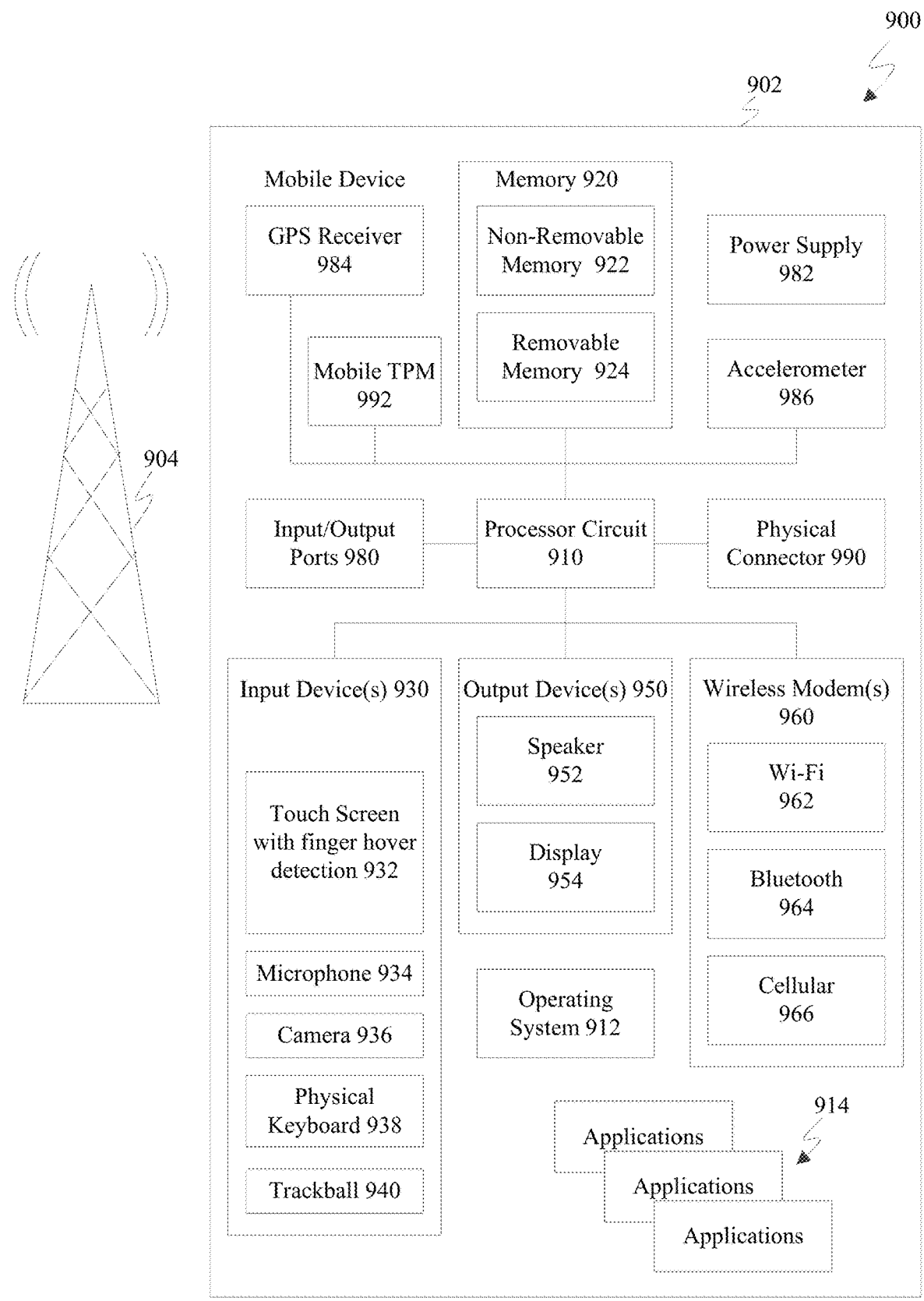
FIG. 9 shows a block diagram of an example mobile device that may be used to implement embodiments.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smartphone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 of FIG. 1, system 200 of FIG. 2, system 300 of FIG. 3, and graphs 600 of FIG. 6, along with any components and/or subcomponents thereof, as well as the flowcharts/flow diagrams described herein, including portions thereof, and/or further examples described herein.

Mobile device 902 can include a mobile TPM 992. Mobile TPM 992 may be a mobile device equivalent embodiment of a TPM, as would be understood by one of skill in the relevant art(s) having the benefit of this disclosure. For example, mobile TPM 992 may be configured to perform one or more functions or operations of TPMs for various embodiments herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

One or more wireless modems 960 can be coupled to antenna(s) (not shown) and can support two-way communications between processor 910 and external devices, as is well understood in the art. Modem 960 is shown generically and can include a cellular modem 966 for communicating with the mobile communication network 904 and/or other radio-based modems (e.g., Bluetooth 964 and/or Wi-Fi 962). At least one wireless modem 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

Figure 10:
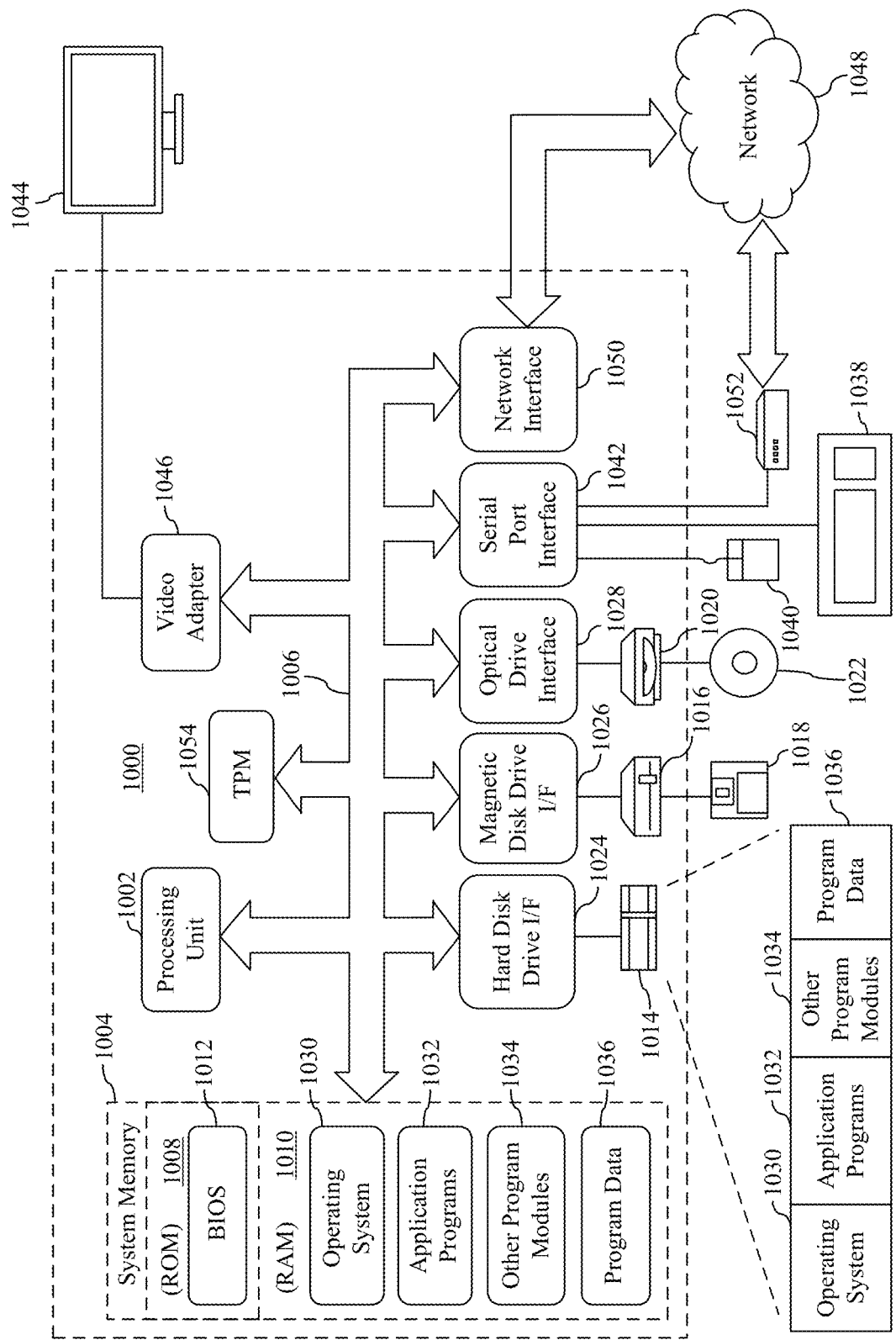
FIG. 10 shows a block diagram of an example computing device that may be used to implement embodiments.

FIG. 10 depicts an exemplary implementation of a computing device 1000 in which embodiments may be implemented. For example, embodiments described herein may be implemented in one or more computing devices or systems similar to computing device 1000, or multiple instances of computing device 1000, in stationary or mobile computer embodiments, including one or more features of computing device 1000 and/or alternative features. The description of computing device 1000 provided herein is provided for purposes of illustration, and is not intended to be limiting. Embodiments may be implemented in further types of computer systems, servers, and/or clusters, etc., as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing embodiments described herein, such as but not limited to, system 100 of FIG. 1, system 200 of FIG. 2, system 300 of FIG. 3, and graphs 600 of FIG. 6, along with any components and/or subcomponents thereof, as well as the flowcharts/flow diagrams described herein, including portions thereof, and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

TPM 1054 may be connected to bus 1006, and may be an embodiment of any TPM, as would be understood by one of skill in the relevant art(s) having the benefit of this disclosure. For example, TPM 1054 may be configured to perform one or more functions or operations of TPMs for various embodiments herein.

As used herein, the terms "computer program medium," "computer-readable medium," "computer-readable storage medium," and "computer-readable storage device," etc., are used to refer to physical hardware media. Examples of such physical hardware media include the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including memory 1020 of FIG. 10). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions for machine learning for system deployments without performance regressions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As described herein, systems, devices, components, etc., of the embodiments that are configured to perform functions and/or operations are also contemplated as performing such functions and/or operations.

Embodiments herein provide for intermediate representations of query plan graphs based on meta-information for graph nodes to provide rich feature sets to train models. Additionally, query plan differences are determined and utilized according to embodiments to understand performance differences of query jobs and train and improve the difference model within the experimentation pipeline to select better representative jobs for model deployment. Further, job information utilizing deployed models is also fed back to further improve/train the pipeline.

As described, machine learning for system deployments without performance regressions embodiments utilize physical and featurized parameters of query plans. That is, the embodiments herein utilize a combination of parameters that provide for improved accuracy and smaller pre-deployment environments, meeting budgetary constraints, which was previously not available for software service and application feature deployments or hardware implementations, much less for iterative, in-pipeline feedback training of models to select representative jobs to determine safe and deployable features.

Embodiments herein are also applicable to mobile and personal devices, and not just to computing devices such as cloud-platforms servers or clusters thereof, desktops, laptops, and/or the like. In such embodiments, a mobile device is configured to perform one or more described aspects of machine learning for system deployments without performance regressions.

The additional examples and embodiments described in this Section may be applicable to examples disclosed in any other Section or subsection of this disclosure.

Embodiments in this description provide for systems, devices, and methods for machine learning for system deployments without performance regressions. For instance, a method performed by a computing device is described herein for performing such embodiments.

A method is described herein. The method is performed by a computing system for machine learning for system deployments without performance regressions, as described herein. The method includes determining, for each of a plurality of query sets in a plurality of query jobs, a query set feature representation, based on a first intermediate representation of features corresponding to each of a plurality of default query plan graphs and a second intermediate representation of features corresponding to each of a plurality of respective optimized query plan graphs, and executing a first subset of the query sets. The method also includes generating execution data of each query set of the first subset, the first subset selected based on a difference, determined by a difference model, between a default value of a performance metric and an optimized value of the performance metric associated with each of the query sets with respective ones of the query set feature representations, and deploying, to a query optimizer in a database host, optimized query models corresponding to a second subset of the query sets that is selected from the first subset based on a retrained version of the difference model that is retrained according to the execution data.

In an embodiment, the method includes generating the plurality of default query plan graphs respectively based on the query sets of the plurality of query sets and corresponding default query models of a plurality of query models, and first meta-information respectively associated with each of the default query plan graphs. In the embodiment, the method includes generating the plurality of optimized query plan graphs respectively based on query sets of the plurality of query sets and corresponding optimized query models of the plurality of query models, and second meta-information respectively associated with each of the optimized query plan graphs.

In an embodiment, the method includes generating the first intermediate representation of features in each node corresponding to each of the default query plan graphs, and generating a second intermediate representation of features in each node corresponding to each of the optimized query plan graphs. In one embodiment of the method, generating the first intermediate representation of features is performed based on the respective first meta-information, and generating the second intermediate representation of features is performed based on the respective second meta-information.

In an embodiment, the method includes performing at least one additional iteration of said executing and said generating, prior to said deploying, that each generates additional execution data, each additional iteration being performed on a respective iterative additional subset ultimately selected from the first subset that is based on a respective iterative additional retrained version of the difference model that is retrained according to the additional execution data of an associated iteration, and the retrained version of the difference model of said deploying is retrained according to a most recent version of the execution data from a latest iteration of said executing.

In an embodiment of the method, the difference model is based on a graph convolution associated with the first intermediate representations, default query plan graphs, second intermediate representations, and optimized query plan graphs.

In an embodiment of the method, deploying further includes querying a database by the database host utilizing the deployed optimized query models of the query optimizer.

A system is also described herein. The system may be configured and enabled in various ways for machine learning for system deployments without performance regressions, as described herein. In embodiments, the systems include a processing system that includes one or more processors, and a memory that stores computer program instructions, that when executed, configure the processing system to generate a first subset of query jobs, from a plurality of query jobs having a plurality of query sets respectively, based on one or more subset criteria, and generate an updated difference model by training a difference model based on execution data received from executed query sets corresponding to the first subset, the difference model configured to determine a difference between a default performance metric and an optimized performance metric corresponding to a query set of a query job based on query set feature representations associated therewith. The processing system is also configured to generate, for each graph pair of graph pairs of the first subset having a first performance metric corresponding to a default query plan graph and a second performance metric corresponding to an optimized query plan graph of respective graphs of the graph pairs, and according to the updated difference model, an updated first performance metric and an updated second performance metric based on respective query set feature representations associated therewith, generate a second subset of query jobs by selecting one or more query jobs of the first subset according to a comparison of a determined initial difference score to an updated difference score between the updated first performance metric and the updated second performance metric, and provide, to a query optimizer, optimized query models associated with at least one query job of the second subset as a deployment model set.

In an embodiment of the system, the processing system is further configured to receive the graph pairs, each comprising a respective default query plan graph corresponding to a default query model and a respective optimized query plan graph corresponding to an optimized query model with both being based on one of the query sets.

In an embodiment of the system, the processing system is further configured to receive query set feature representations, each of which respectively correspond to the graph pairs and are based on intermediate representations of features in nodes of the respective default query plan graph or the respective optimized query plan graph.

In an embodiment of the system, the processing system is further configured to generate, for each graph pair and according to the difference model, the first performance metric and the second performance metric, based on the associated one of the query set feature representations.

In an embodiment of the system, the processing system is further configured to generate a first importance score for a first node of a first default query plan graph, generate a second importance score for a second node of a first optimized query plan graph that has a same physical operator as the first node, determine one or more factors that are indicative of a variation value between the first importance score and the second importance score based on respective intermediate representations of the first default query plan graph and of the first optimized query plan graph according to attention, and provide at least one of the variation value, the one or more factors, or information associated with the one or more factors in an output report.

In an embodiment of the system, the one or more subset criteria include a comparison of a threshold value to a determined difference score between the first performance metric and the second performance metric, or a subset model that incorporates constraints of a pre-production environment utilized in generating the execution data.

In an embodiment of the system, the processing system is further configured to, prior to the provide step, generate a further updated difference model by training the updated difference model based on further execution data received from executed query sets of the plurality of query sets corresponding to the second subset, generate, for graph pair of graph pairs of the second subset, and according to the further updated difference model, a further updated first performance metric and a further updated second performance metric based on respective query set feature representations associated therewith, and generate a third subset of query jobs by selecting one or more query jobs of the second subset according to a comparison of a further determined initial difference score to a further updated difference score between the further updated first performance metric and the further updated second performance metric. In the embodiment, the provide step includes to provide optimized query models associated with at least one query job of the third subset as the deployment model set.

Computer-readable storage media having program instructions recorded thereon that, when executed by a processing system, perform methods, are also described. The methods are for machine learning for system deployments without performance regressions, as described herein. The method includes generating a first subset of query jobs, from a plurality of query jobs having a plurality of query sets respectively, based on one or more subset criteria, and generating an updated difference model by training a difference model based on execution data received from executed query sets corresponding to the first subset, the difference model configured to determine a difference between a default performance metric and an optimized performance metric corresponding to a query set of a query job based on query set feature representations associated therewith. The method also includes generating, for each graph pair of graph pairs of the first subset having a first performance metric corresponding to a default query plan graph and a second performance metric corresponding to an optimized query plan graph of respective graphs of the graph pairs of the first subset, and according to the updated difference model, an updated first performance metric and an updated second performance metric based on respective query set feature representations associated therewith, generating a second subset of query jobs by selecting one or more query jobs of the first subset according to a comparison of a determined initial difference score to an updated difference score between the updated first performance metric and the updated second performance metric, and providing, to a query optimizer, optimized query models associated with at least one query job of the second subset as a deployment model set.

In an embodiment of the computer-readable storage medium, the method includes receiving the graph pairs, each comprising a respective default query plan graph corresponding to a default query model and a respective optimized query plan graph corresponding to an optimized query model with both being based on one of the query sets.

In an embodiment of the computer-readable storage medium, the method includes receiving query set feature representations, each of which respectively correspond to graph pairs and are based on intermediate representations of features in nodes of the respective default query plan graph or the respective optimized query plan graph.

In an embodiment of the computer-readable storage medium, the method includes generating, for each graph pair and according to the difference model, the first performance metric and the second performance metric, based on the associated one of the query set feature representations.

In an embodiment of the computer-readable storage medium, the method includes generating a first importance score for a first node of a first default query plan graph, generating a second importance score for a second node of a first optimized query plan graph that has a same physical operator as the first node, determining one or more factors that are indicative of a variation value between the first importance score and the second importance score based on respective intermediate representations of the first default query plan graph and of the first optimized query plan graph according to attention, and providing at least one of the variation value, the one or more factors, or information associated with the one or more factors in an output report.

In an embodiment of the computer-readable storage medium, for the method, the one or more subset criteria include a comparison of a threshold value to a determined difference score between the first performance metric and the second performance metric, or a subset model that incorporates constraints of a pre-production environment utilized in generating the execution data.

In an embodiment of the computer-readable storage medium, the method includes, prior to providing, generating a further updated difference model by training the updated difference model based on further execution data received from executed query sets corresponding to the second subset, generating, for each graph pair of graph pairs of the second subset, and according to the further updated difference model, a further updated first performance metric and a further updated second performance metric based on respective query set feature representations associated therewith, and generating a third subset of query jobs by selecting one or more query jobs of the second subset according to a comparison of a further determined initial difference score to a further updated difference score between the further updated first performance metric and the further updated second performance metric. In the embodiment, for the method, providing includes providing optimized query models associated with at least one query job of the third subset as the deployment model set.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method performed by a computing system, the method comprising:
    determining, for each of a plurality of query sets in a plurality of query jobs, a query set feature representation, based on a first intermediate representation of features corresponding to each of a plurality of default query plan graphs and a second intermediate representation of features corresponding to each of a plurality of respective optimized query plan graphs;
    executing a first subset of the query sets;
    generating execution data of each query set of the first subset, the first subset selected based on a difference, determined by a difference model, between a default value of a performance metric and an optimized value of the performance metric associated with each of the query sets with respective ones of the query set feature representations; and
    deploying, to a query optimizer in a database host, optimized query models corresponding to a second subset of the query sets that is selected from the first subset based on a retrained version of the difference model that is retrained according to the execution data.

2. The method of claim 1, further comprising:
    generating:
        the plurality of default query plan graphs respectively based on the query sets of the plurality of query sets and corresponding default query models of a plurality of query models, and
        first meta-information respectively associated with each of the default query plan graphs; and
    generating:
        the plurality of optimized query plan graphs respectively based on query sets of the plurality of query sets and corresponding optimized query models of the plurality of query models, and
        second meta-information respectively associated with each of the optimized query plan graphs.

3. The method of claim 2, further comprising:
    generating the first intermediate representation of features in each node corresponding to each of the default query plan graphs; and
    generating a second intermediate representation of features in each node corresponding to each of the optimized query plan graphs.

4. The method of claim 3, wherein said generating the first intermediate representation of features is performed based on the respective first meta-information; and
    wherein said generating a second intermediate representation of features is performed based on the respective second meta-information.

5. The method of claim 1, further comprising:
    performing at least one additional iteration of said executing and said generating, prior to said deploying, that each generates additional execution data, each additional iteration being performed on a respective iterative additional subset ultimately selected from the first subset that is based on a respective iterative additional retrained version of the difference model that is retrained according to the additional execution data of an associated iteration; and
    wherein the retrained version of the difference model of said deploying is retrained according to a most recent version of the execution data from a latest iteration of said executing.

6. The method of claim 1, wherein the difference model is based on a graph convolution associated with the first intermediate representations, default query plan graphs, second intermediate representations, and optimized query plan graphs; or wherein said deploying further comprises:
  querying a database by the database host utilizing the deployed optimized query models of the query optimizer.

7. A system that comprises:
a processing system comprising one or more processors; and
a memory configured to store program instructions that, when executed, configure the processing system to:
  generate a first subset of query jobs, from a plurality of query jobs having a plurality of query sets respectively, based on one or more subset criteria;
  generate an updated difference model by training a difference model based on execution data received from executed query sets corresponding to the first subset, the difference model configured to determine a difference between a default performance metric and an optimized performance metric corresponding to a query set of a query job based on query set feature representations associated therewith;
  generate, for each graph pair of graph pairs of the first subset having a first performance metric corresponding to a default query plan graph and a second performance metric corresponding to an optimized query plan graph of respective graphs of the graph pairs, and according to the updated difference model, an updated first performance metric and an updated second performance metric based on respective query set feature representations associated therewith;
  generate a second subset of query jobs by selecting one or more query jobs of the first subset according to a comparison of a determined initial difference score to an updated difference score between the updated first performance metric and the updated second performance metric; and
  provide, to a query optimizer, optimized query models associated with at least one query job of the second subset as a deployment model set.

8. The system of claim 7, wherein the processing system is further configured to:
  receive the graph pairs, each comprising a respective default query plan graph corresponding to a default query model and a respective optimized query plan graph corresponding to an optimized query model with both being based on one of the query sets.

9. The system of claim 8, wherein the processing system is further configured to:
  receive query set feature representations, each of which respectively correspond to the graph pairs and are based on intermediate representations of features in nodes of the respective default query plan graph or the respective optimized query plan graph.

10. The system of claim 9, wherein the processing system is further configured to:
  generate, for each graph pair and according to the difference model, the first performance metric and the second performance metric, based on the associated one of the query set feature representations.

11. The system of claim 9, wherein the processing system is further configured to:
  generate a first importance score for a first node of a first default query plan graph;
  generate a second importance score for a second node of a first optimized query plan graph that has a same physical operator as the first node;
  determine one or more factors that are indicative of a variation value between the first importance score and the second importance score based on respective intermediate representations of the first default query plan graph and of the first optimized query plan graph according to attention; and
  provide at least one of the variation value, the one or more factors, or information associated with the one or more factors in an output report.

12. The system of claim 7, wherein the one or more subset criteria comprise:
  a comparison of a threshold value to a determined difference score between the first performance metric and the second performance metric, or
  a subset model that incorporates constraints of a pre-production environment utilized in generating the execution data.

13. The system of claim 7, wherein the processing system is further configured to:
  prior to said provide:
    generate a further updated difference model by training the updated difference model based on further execution data received from executed query sets of the plurality of query sets corresponding to the second subset;
    generate, for each graph pair of graph pairs of the second subset, and according to the further updated difference model, a further updated first performance metric and a further updated second performance metric based on respective query set feature representations associated therewith; and
    generate a third subset of query jobs by selecting one or more query jobs of the second subset according to a comparison of a further determined initial difference score to a further updated difference score between the further updated first performance metric and the further updated second performance metric; and
  wherein said provide comprises to provide optimized query models associated with at least one query job of the third subset as the deployment model set.

14. A computer-readable storage medium having program instructions recorded thereon that, when executed by a processing system, perform a method comprising:
  generating a first subset of query jobs, from a plurality of query jobs having a plurality of query sets respectively, based on one or more subset criteria;
  generating an updated difference model by training a difference model based on execution data received from executed query sets corresponding to the first subset, the difference model configured to determine a difference between a default performance metric and an optimized performance metric corresponding to a query set of a query job based on query set feature representations associated therewith;
  generating, for each graph pair of graph pairs of the first subset having a first performance metric corresponding to a default query plan graph and a second performance metric corresponding to an optimized query plan graph of respective graphs of the graph pairs of the first subset, and according to the updated difference model, an updated first performance metric and an updated second performance metric based on respective query set feature representations associated therewith;
  generating a second subset of query jobs by selecting one or more query jobs of the first subset according to a comparison of a determined initial difference score to an updated difference score between the updated first performance metric and the updated second performance metric; and providing, to a query optimizer, optimized query models associated with at least one query job of the second subset as a deployment model set.

15. The computer-readable storage medium of claim 14, wherein the method includes:
receiving the graph pairs, each comprising a respective default query plan graph corresponding to a default query model and a respective optimized query plan graph corresponding to an optimized query model with both being based on one of the query sets.

16. The computer-readable storage medium of claim 15, wherein the method includes:
receiving query set feature representations, each of which respectively correspond to graph pairs and are based on intermediate representations of features in nodes of the respective default query plan graph or the respective optimized query plan graph.

17. The computer-readable storage medium of claim 16, wherein the method includes:
generating, for each graph pair and according to the difference model, the first performance metric and the second performance metric, based on the associated one of the query set feature representations.

18. The computer-readable storage medium of claim 16, wherein the method includes:
generating a first importance score for a first node of a first default query plan graph;
generating a second importance score for a second node of a first optimized query plan graph that has a same physical operator as the first node;
determining one or more factors that are indicative of a variation value between the first importance score and the second importance score based on respective intermediate representations of the first default query plan graph and of the first optimized query plan graph according to attention; and
providing at least one of the variation value, the one or more factors, or information associated with the one or more factors in an output report.

19. The computer-readable storage medium of claim 14, wherein the one or more subset criteria comprise:
a comparison of a threshold value to a determined difference score between the first performance metric and the second performance metric, or
a subset model that incorporates constraints of a pre-production environment utilized in generating the execution data.

20. The computer-readable storage medium of claim 14, wherein the method includes:
prior to said providing:
generating a further updated difference model by training the updated difference model based on further execution data received from executed query sets corresponding to the second subset;
generating, for each graph pair of graph pairs of the second subset, and according to the further updated difference model, a further updated first performance metric and a further updated second performance metric based on respective query set feature representations associated therewith; and
generating a third subset of query jobs by selecting one or more query jobs of the second subset according to a comparison of a further determined initial difference score to a further updated difference score between the further updated first performance metric and the further updated second performance metric; and
wherein said providing comprises providing optimized query models associated with at least one query job of the third subset as the deployment model set.

* * * * *